United States Patent [19]

Friedling et al.

[11] 4,231,400
[45] Nov. 4, 1980

[54] REMOVABLE TWO-WAY CONNECTOR FOR A FAUCET NOZZLE

[76] Inventors: Gerard Friedling, 7, ch. des Bruchons, CH 1225 Veyrier (Genèva); Marcel Chuard, 7d, ch. Vert, CH 1217 Meyrin (Geneva), both of Switzerland

[21] Appl. No.: 40,591

[22] Filed: May 21, 1979

[30] Foreign Application Priority Data

May 30, 1978 [CH] Switzerland .......................... 5881/78

[51] Int. Cl.³ ............................................. F16L 37/28
[52] U.S. Cl. .................................... 137/798; 239/447; 285/8; 285/322
[58] Field of Search ................. 137/798; 239/445, 447; 285/8, 243, 309, 310, 314, 319, 322

[56] References Cited

U.S. PATENT DOCUMENTS

| 2,356,333 | 8/1944 | Matter | 285/8 |
| 2,973,974 | 3/1961 | Disney | 285/8 |
| 3,271,053 | 9/1966 | Kurachi | 285/8 |

Primary Examiner—Gerald A. Michalsky
Attorney, Agent, or Firm—Kurt Kelman

[57] ABSTRACT

The removable two-way connector is designed for faucets with a nozzle for feeding auxiliary apparatus, such as shower heads, massage devices and the like. It comprises a body with an annular wall divided into four segments and defining a cavity in which a deformable packing sleeve is disposed. The wall has a peripheral wall forming a spiral camming face at each wall segment. A rotary cover caps the cavity and has radially inwardly extending ribs with cam follower faces engaging the spiral camming faces. When the cover is turned, the wall segments are forced radially inwardly by the displacement of the cover ribs along the camming faces whereby the inwardly forced wall segments are pressed against the adjacent deformable sleeve and the sleeve sealingly engages a nozzle surrounded thereby.

7 Claims, 6 Drawing Figures

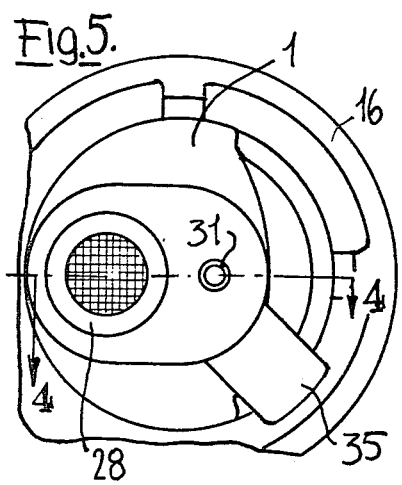
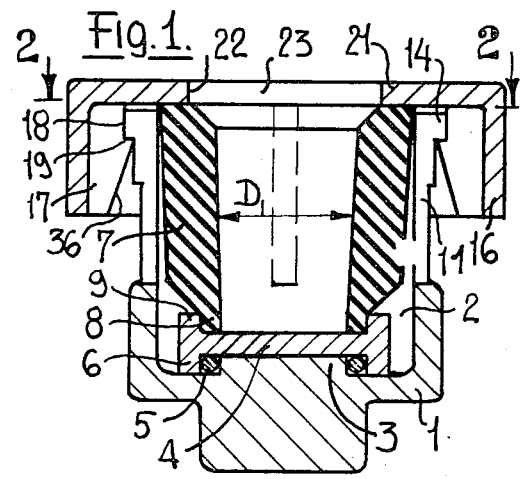
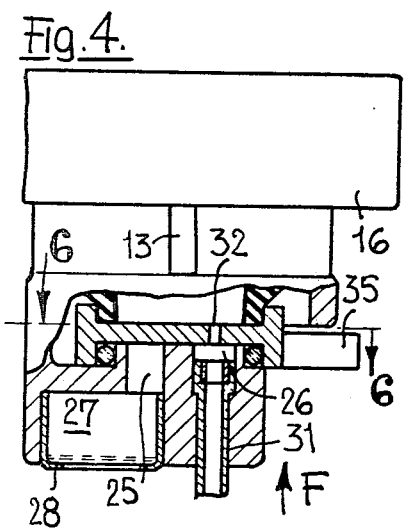
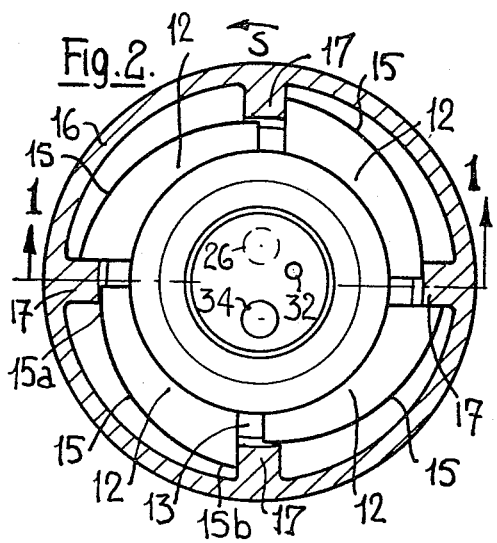
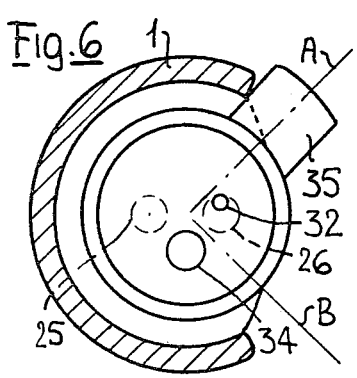
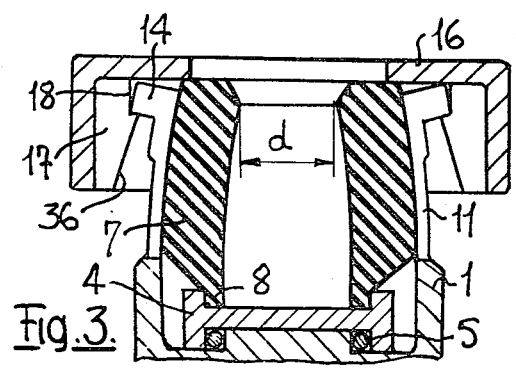

REMOVABLE TWO-WAY CONNECTOR FOR A FAUCET NOZZLE

The present invention relates to a removable two-way connector for a faucet nozzle.

To provide a derivative or secondary water flow to auxiliary apparatus, such as shower heads, massage devices and the like, it has been proposed to provide removable two-way faucet connectors designed to be mounted on a faucet nozzle, spout or the like which is provided in the main water conduit.

One known removable connector for such faucet nozzles or spouts comprises a threaded connector screwed on a threaded portion of the nozzle. This type of connector is not always convenient, in view of the great diversity of threads on various faucets or the total absence thereof.

Another conventional connector comprises a flexible connector sleeve simply mounted on the nozzle, with or without an additional tightening collar. This type of mounting is not secure enough for auxiliary apparatus which comprises a movable control element, such as a lever, a button or the like, which must be capable of being actuated readily to direct the flow of water one or the other way.

It is the primary object of this invention to provide a removable two-way connector for a faucet nozzle which is adaptable to various shapes and dimensions of nozzles or spouts while providing a secure connection facilitating the operation of any movable control elements.

This and other objects are accomplished in accordance with the invention with a removable two-way connector which comprises a body having a generally annular wall divided into a plurality of segments by gaps defined between the segments. The annular wall defines a cavity in the body and includes a peripheral flange configured to form a spiral camming face at each wall segment. A deformable packing sleeve is disposed in the cavity adjacent the generally annular wall and a rotary cover is mounted on the body and caps the cavity. The cover has radially inwardly extending ribs having cam follower faces arranged to engage the spiral camming faces. The body wall and cover are arranged to cooperate to force the wall segments radially inwardly upon rotation of the cover in relation to the body and corresponding displacement of the cover ribs along the sprial camming faces whereby the inwardly forced wall segments are pressed against the deformable packing sleeve and the sleeve sealingly engages a nozzle surrounded by the sleeve.

The above and other objects and features of the present invention will become more apparent from the following detailed description of a now preferred embodiment thereof, taken in conjunction with the accompanying drawing wherein FIG. 1 is an axial section along line 1—1 of FIG. 2;

FIG. 2 is a transverse section along line 2—2 of FIG. 1;

FIG. 3 shows a section analogous to that of FIG. 1, with the connector in another operating position;

FIG. 4 is a fragmentary view, partially in side elevation and partially in a section along line 4—4 of FIG. 5;

FIG. 5 is a bottom view in the direction of arrow F in FIG. 4; and

FIG. 6 is a sectional view along line 6—6 of FIG. 4.

Referring now to the drawing, the illustrated embodiment is shown to comprise body 1 having generally annular wall 11 divided into a plurality of segments 12 by gaps or slots 13 defined between the wall segments. The annular wall defines cavity 2 in body 1 and includes peripheral flange 14 configured to form spiral camming face 15 at each wall segment 12. In the illustrated embodiment, body 1 is a molded synthetic resin body. Body 1 comprises circular boss 3 forming the bottom of cavity 2, and rotary closure 4 is mounted on the boss. The rotary closure comprises annular flange 6 depending from the closure and radially spaced from the peripheral face of circular boss 3. Annular gasket 5 is disposed between the peripheral face of the boss and annular flange 6 whereby the closure is centered on the boss.

Closure 4 is held in contact with boss 3 by the axial pressure applied against the closure by deformable packing sleeve 7 disposed in cavity 2 adjacent generally annular wall 11. This sleeve may be made of any suitable elastic material, such as natural or synthetic rubber, for example. Deformable sleeve 7 comprises annular lip 8 engaging the closure and encased by annular flange 9 rising from closure 4.

In the rest position, as shown in FIG. 1, deformable sleeve 7 has a slightly conical peripheral surface which tapers downwardly towards closure 4, the upper portion of the peripheral sleeve surface pressing against the upper portion of the interior surface of annular wall 11 while the lower portion of that peripheral surface is radially spaced from the interior wall surface.

In the illustrated embodiment, annular wall 11 is divided into four segments 12, four radial gaps 13 extending in an axial direction over a major portion of the length of wall 11 to separate the wall segments from each other. Peripheral flange 14 projects radially outwardly from the upper end of annular wall 11 and this flange forms, for each segment 12, spiral camming face 15 extending over a quarter of the periphery from a low end 15a closest to the axis to a high end 15b most remote therefrom, as shown in FIG. 2.

Rotary cover 16 is mounted on body 1 and caps cavity 2. The cover has four radially inwardly extending ribs 14 having cam follower faces 18 arranged to engage spiral camming faces 15 and shoulders 19 subtending peripheral flange 14 and engaging the same (see FIG. 1). Bottom 21 of cup-shaped rotary cover 16 defines central port 23 designed to permit the nozzle or spout of a faucet (not shown) to pass therethrough into cavity 2 of body 1. Body wall 11 and cover 16 are arranged to cooperate to force wall segments 12 radially inwardly (see FIG. 3) upon rotation of the cover in relation to the body and corresponding displacement of cover ribs 17 along spiral camming faces 15 whereby inwardly forced wall segments 12 are pressed against deformable sleeve 7 and the sleeve sealingly engages the nozzle or spout introduced into cavity 2 through port 22. It will be noted from FIGS. 1 and 3 that rim 22 of cover bottom 21 defining port 23 engages the upper end of the deformable sleeve so as to hold the sleeve in contact with, and axially pressed against, closure 4.

In the angular position of cover 16 shown in FIGS. 1 and 2, ribs 17 engage low ends 15a of the camming faces and wall 11 remains substantially cylindrical. Upon counterclockwise rotation of cover 16, as indicated by arrow S, ribs 17 are displaced peripherally along camming faces 15 and, after a quarter turn, they engage high ends 15b of the camming faces, forcing wall segments 12 slightly radially inwardly, as shown in FIG. 3, thus compressing deformable sleeve 7 to reduce its upper diameter from dimension D shown in FIG. 1 to dimension d shown in FIG. 3. In this manner, the connector is affixed to the nozzle of the faucet.

Referring now more particularly to FIGS. 2 and 4–6, closure 4 is shown to be pierced by two ports 32 and 34 while boss 3 defines two bores 25 and 26. Bore 25 communicates with chamber 27 equipped with water-dispensing head 28 designed to deliver water to a washbasin. Bore 26 receives hose 31 designed to deliver water to a shower head or other auxiliary apparatus. Laterally projecting handle 35 extend radially from the closure and permits the closure to be displaced between two angular positions indicated by A and B in FIG. 6, the handle projecting through a segmental slot in body 1 which delimits the angular displacement of the closure. In position A illustrated in FIGS. 4 and 6, small diameter port 32 registers with bore 26 which receives flexible hose 31 while large-diameter port 34 remains closed. In position B illustrated in FIG. 2, large diameter port 34 registers with bore 25 to provide for water flow to the spout while port 34 remains closed. When closure 4 is displaced from one position into the other, the second port is opened before the first port is closed so that a constant water flow is assured, dispensing with the need for a distributing connector as a closure element.

Deformable sleeve 7, which may be tightly engaged with the nozzle or spout of a faucet upon rotation of cover 16, constitutes a attachment means for mounting the connector rapidly and in a secure and water-tight manner on spouts or nozzles of all types of faucets. When the connector is emplaced, the radial compression of the sleeve in the auxiliary limited spaced defined between bottom 21 of the cover and closure 4 assures not only tight radial engagement with the nozzle or spout but also imparts an axial pressure component to the sleeve for tight engagement with closure 4 so that the closure tightly engages central boss 3 of connector body 1. Cover 16 may be readily placed on the connector body, due to the resiliency of wall segments 12 which will be radially inwardly displaced by inclined inner faces 36 of cover ribs 17 as cover 16 is pressed down axially on body 1 until shoulders 19 snap under peripheral flange 14. In this manner, all the component parts of the connector are firmly assembled in one simple mounting stage. It is, of course, very simple to replace deformable sleeve 7 to meet any requirements.

What is claimed is:

1. A removable two-way connector for a faucet nozzle, which comprises
    (a) a body having a generally annular wall divided into a plurality of segments by gaps defined between the segments, the annular wall defining a cavity in the body and including a peripheral flange, the flange bring configured to form a spiral camming face at each wall segment,
    (b) a deformable packing sleeve disposed in the cavity adjacent the generally annular wall, and
    (c) a rotary cover mounted on the body and capping the cavity, the cover having radially inwardly extending ribs having cam follower faces arranged to engage the spiral camming faces, the body wall and cover being arranged to cooperate to force the wall segments radially inwardly upon rotation of the cover in relation to the body and corresponding displacement of the cover ribs along the spiral camming faces whereby the inwardly forced wall segments are pressed against the deformable packing sleeve and the sleeve sealingly engages a nozzle surrounded by the sleeve.

2. The removable connector of claim 1, wherein the ribs further comprise a shoulder subtending the peripheral flange and engaging the same.

3. The removable connector of claim 1, wherein the body further comprises a circular boss forming the bottom of the cavity, and further comprising a rotary closure mounted on the boss.

4. The removable connector of claim 3, wherein the deformable sleeve comprises an annular lip engaging the closure.

5. The removable connector of claim 4, wherein the rotary closure comprises an annular flange surrounding the annular lip of the deformable sleeve and encasing the lip.

6. The removable connector of claim 3, wherein the rotary closure comprises an annular flange radially spaced from the peripheral face of the circular boss, and further comprising an annular gasket disposed between the peripheral face of the boss and the annular flange whereby the closure is centered on the boss.

7. The removable connector of claim 1, wherein the annular wall is divided into four segments.

* * * * *